United States Patent [19]

Carrow

[11] 4,069,001
[45] Jan. 17, 1978

[54] APPARATUS FOR FORMING A THICK-WALLED TUBULAR PRODUCT

[75] Inventor: Guy E. Carrow, Bartlesville, Okla.

[73] Assignee: Phillips Petroleum Company, Bartlesville, Okla.

[21] Appl. No.: 707,724

[22] Filed: July 22, 1976

Related U.S. Application Data

[60] Division of Ser. No. 301,899, Oct. 30, 1972, Pat. No. 3,980,746, which is a continuation-in-part of Ser. No. 76,100, Sept. 28, 1970, abandoned.

[51] Int. Cl.² .............................................. B29F 3/08
[52] U.S. Cl. ................................ 425/467; 425/378 R; 425/380
[58] Field of Search ................. 264/209; 425/467, 466, 425/380, 381, 378 R, 379 R; 72/264, 267, 268

[56] References Cited

U.S. PATENT DOCUMENTS

| 2,400,055 | 5/1946 | Wallace | 264/209 X |
| 2,975,475 | 3/1961 | Heston | 425/466 |
| 3,309,443 | 3/1967 | Scott, Jr. et al. | 264/209 X |
| 3,393,427 | 7/1968 | Larsen | 425/380 X |

FOREIGN PATENT DOCUMENTS 27,911   11/1970   Japan ................................. 425/467

Primary Examiner—Francis S. Husar
Assistant Examiner—Mark Rosenbaum

[57] ABSTRACT

A mandrel and bushing sizing die assembly has an annulus formed between the mandrel and the bushing of the assembly for passing plastic material therethrough and forming a thick-walled tubular product. A middle portion of the annulus has a thickness in the range of about 25-50 percent of the greatest thickness of a first end portion of the annulus and the second, discharge end of the annulus has a thickness greater than about 1/4-inch and greater than the thickness of the middle portion of the annulus.

4 Claims, 1 Drawing Figure

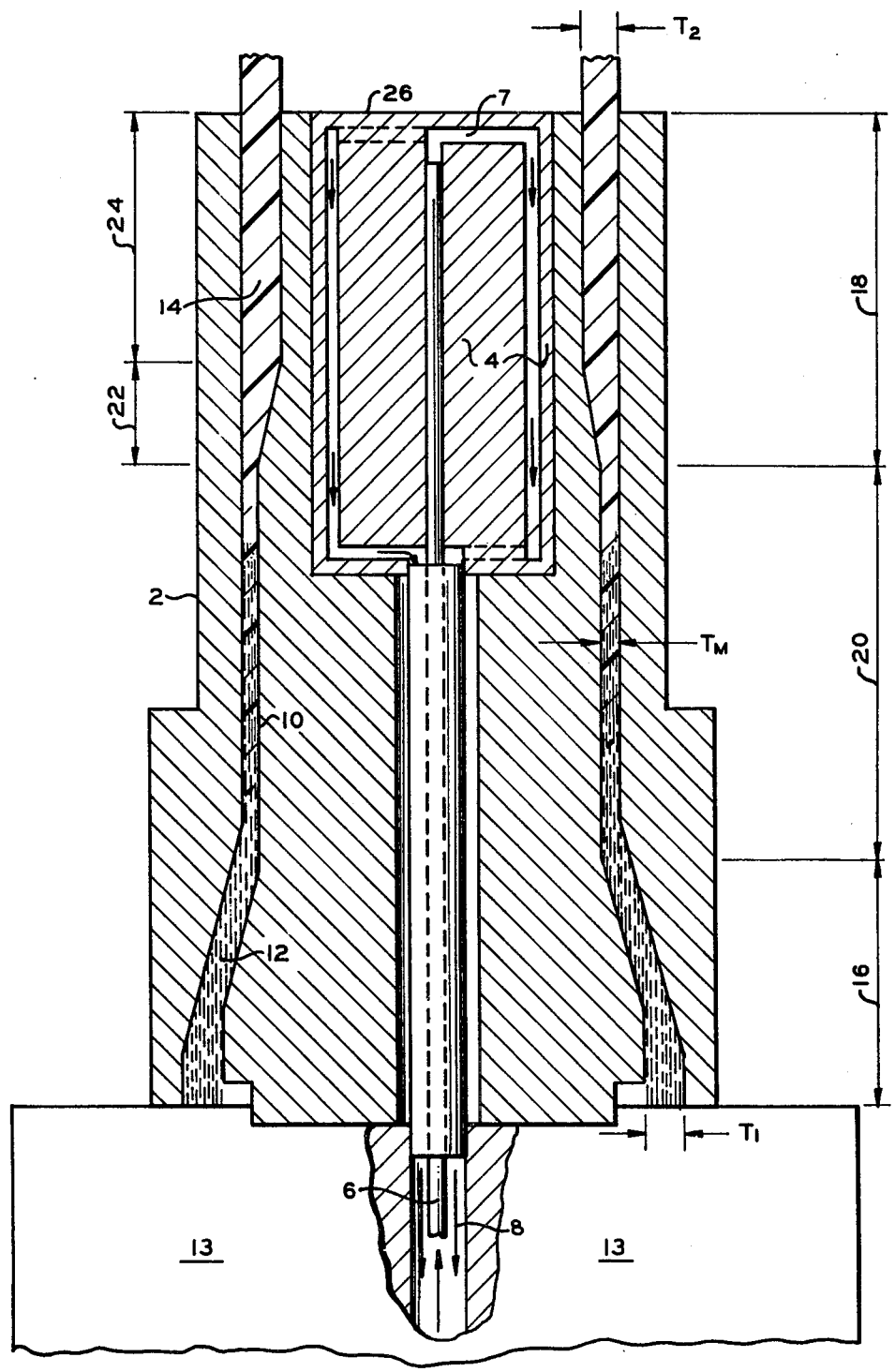

APPARATUS FOR FORMING A THICK-WALLED TUBULAR PRODUCT

This is a division of copending application Ser. No. 301,899, filed Oct. 30, 1972 now U.S. Pat. No. 3,980,746, which was a continuation-in-part of Ser. No. 76,100, filed Sept. 28, 1970, now abandoned.

In the dynamic extrusion of thick-walled plastic tubing, the extrusion rate is limited by the cooling rate of the plastic within the sizing die assembly.

This invention therefore resides in an apparatus for reducing the temperature of the plastic passing through a sizing die from an extruder by reducing the thickness of the middle portion of the annulus to within the range of about 25–50 percent of the greatest thickness of the first portion or end portion of the annulus and increasing the thickness of the second, discharge portion or end of the annulus to a thickness greater than about ¼-inch and greater than the thickness of the middle portion of the annulus.

Other aspects, objects, and advantages of the present invention will become apparent from a study of the disclosure, the appended claims, and the drawing.

The drawing is a diagrammatic view in longitudinal cross section of a mandrel and bushing sizing die assembly of an extruder.

In the drawing, a bushing 2 has an axis and an opening extending coaxially therethrough. A mandrel 4 is coaxially received in the opening of the bushing 2. The mandrel 4 has an axis and a plurality of fluid pathways formed therethrough for passing a cooling fluid through the mandrel 4. The fluid pathways of the mandrel 4 are formed by a first opening 6 extending axially therethrough for coolant entry and a second opening 8 positioned about the first opening 6 for coolant exit. There are, preferably, circulating pathways 7 formed through the mandrel 4 connecting the first opening 6 and second opening 8 for providing uniform cooling of the plastic material 12 that is passed over and out of periphery 10 of the mandrel 4.

As known in the art, an annulus 14 is formed between the mandrel 4 and the bushing 2 of the sizing die assembly for the sizing and forming of plastic material 12 passing from the extruder 13 through the assembly. The annulus 14 of the apparatus of this invention has first and second end portions 16, 18 and a middle portion 20. The outer periphery 10 of the mandrel 4 and the opening of the bushing 2 are of dimensions relative one to the other for forming the annulus 14 in the coaxial inserted position of the mandrel 4 within the bushing 2.

The middle portion 20 of the annulus 14 preferably has a cross-sectional area over a preselected distance that is less than the cross-sectional area of the first end portion 16 of the annulus 14 in order to assure more uniform cooling of the material. At least a portion, of the middle portion 20 of the annulus 14 is adjacent the second opening 8 and fluid pathways of the mandrel 4 for cooling the plastic material 12. At the middle portion 20 of the annulus 14, the thickness "$T_m$" is in the range of 25–50 percent of the greatest thickness "$T_l$" of the first end portion 16 of the annulus. At thicknesses greater than "$T_m$" there is not sufficient cooling of the plastic material over a unit length of the assembly and at thicknesses less than "$T_m$", cooling is too rapid per unit volume of material and the plastic material hardens to values which cause the annulus to slug, cause the resultant product to undesirably stress or cause other undesirable occurrences.

The length of the reduced middle portion 20 of the annulus is dependent upon many variables that are selected by the operator such as desired extrusion rate, dimensions of the middle 20 and downstream end portions 18 of the annulus 14, temperatures of the extrudate, type of extrudate, and the temperature of the cooling fluid passing through the mandrel 4, for example. This length can be calculated by one skilled in the art after the operator has selected the dimensions of the tubular product he desires, plastic material to be utilized, and the production rate.

For maximum production rates, the extrudate passing through the annulus 14 should be cooled in the middle portion 20 of the annulus 14 to a temperature at which the plastic material 12 will fill the second end portion 18 of the annulus 14 and solidify therein as near the middle portion 20 of the annulus 14 as possible.

In order to prevent undesirable stresses from being placed on the forming product which will cause zones of weakness to be formed in the product, it is desirable that the second zone be comprised of a transition zone 22 at which the cooled plastic material is progressively, uniformly increased in thickness and a final zone 24 having a length over which the dimensions of the plastic material are maintained substantially constant for further cooling and setting. If there are abrupt changes in the thickness in the transition zone 22, the aforementioned undesirable stresses may cause weakened areas in the final product. Likewise, if the length of the final zone 24 is not maintained of substantially uniform thickness ($T_2$), the highly viscous material may likewise be subject to stresses which, with the plastic material substantially cooled, may form cracks through the article.

These limitations of thicknesses $T_l$ and $T_m$ and configurations of zones 22 and 24 are of little importance when forming thin-walled plastic conduit, film bags, etc. However, when the thickness $T_2$ of the extrusion conduit at the second end 26 of the die assembly is greater than about one-quarter inch, such as for example in a large diameter conduit (4 inches and greater), these limitations are of great importance in producing a high quality conduit adapted for resisting damage from higher pressures and having greater impact loading.

Example dimensions that have proved to be effective in producing high quality thick-walled conduit by the method of this invention are as follows:

EXAMPLE

| Bushing | |
|---|---|
| Length: | |
|   Overall | 24.7+ in. |
|   1st end portion | 3.9+ in. |
|   Middle portion | 3.5+ in. |
|   2nd end portion | 17.2+ in. |
| Inside Diameter: | |
|   1st end portion | 6.2+ to 4.6+ in. tapered |
|   Middle portion | 4.6+ in. |
|   2nd end portion | 4.6+ in. |
| Outside Diameter: | |
|   2nd end portion | 5.5+ in. |
| Mandrel | |
| Length: | |
|   Overall | 24.9+ in. |
| Outside Diameter: | |
|   1st end portion | 5.2+ to 4.0+ in. tapered |
|   Middle portion | 4.0+ in. |
|   2nd end portion | 3.7+ in. |
| Water temperature | 100° F or less |
| Material | High density polyethylene |
| $T_1$ (largest thickness) = .5 in. | |
| $T_m$ (largest thickness) = .25 in. | |
| $T_2$ (largest thickness) = .45 in. | |

In the operation of the apparatus of this invention, a volume of plastic material 12 such as, for example, polyethylene, polypropylene, polyvinylchloride, nylon, and the like, is extruded from the dynamic extruder 13 into the first end portion 16 of the annulus 14 of the sizing die assembly. The plastic material 12 passes through the first end portion 16 of the annulus 14 and the middle portion 20 of the annulus 14 wherein the cross-sectional area of the plastic material 12 is reduced. A cooling fluid is passed through the mandrel 4 adjacent the plastic material 12 in the middle portion 20 of the annulus and cools said plastic material 12 therein. The cooled plastic material 12 passes through zone 22 of the second end portion 18 of the annulus wherein the cross-sectional area of the plastic material 12 increases to the dimensions of the desired tubular product and is passed through zone 24 while being maintained at these dimensions. In zone 24 of the second end portion 18 of the annulus 14, the cooled plastic material 12 further cools to a temperature at which the plastic material 12 solidifies and forms a set. The formed set tubular product is thereafter discharged from the annulus 14 and recovered.

Other modifications and alterations of this invention will become apparent to those skilled in the art from the foregoing discussion, example, and accompanying drawing and it should be understood that this invention is not to be unduly limited thereto.

I claim:

1. An extrusion die assembly for forming a thick-walled tubular product, including a mandrel and bushing, said bushing having an axis and an opening extending therethrough for coaxially receiving said mandrel and said mandrel having an axis and a plurality of fluid pathways formed therethrough for passing a cooling fluid through the mandrel for cooling extrudate passing from an associated dynamic extruder through an annulus formed between said mandrel and said bushing, the improvement comprising:

said annulus having first, middle and second portions, the first portion being located upstream with respect to the second portion, said middle portion of said annulus having a wall thickness in the range of 25 to 50 percent of the greatest wall thickness of said first portion of said annulus and said second portion of said annulus having a wall thickness greater than one-quarter inch and being greater than the wall thickness of said middle portion of said annulus, and at least a portion of said middle portion of said annulus and of said second end portion of said annulus are adjacent the fluid pathways formed through said mandrel.

2. Apparatus in accordance with claim 1 wherein said second end portion of said annulus has upstream and downstream zones, said upstream zone tapering in wall thickness from that of said middle portion to that of said downstream zone and said downstream zone having a substantially constant wall thickness along its length equal to said wall thickness of said second portion of said annulus.

3. Extrusion die assembly for use with an extruder comprising:

a bushing;

a mandrel inserted coaxially into said bushing to form an annulus having first, middle and second portions, said first portion being positionable adjacent to and downstream with respect to said extruder and said second portion being downstream with respect to said first portion, said middle portion of said annulus having a wall thickness in the range of 25 to 50 percent of the greatest wall thickness of said first portion of said annulus and said second portion of said annulus having a wall thickness greater than one-quarter inch and being greater than the wall thickness of said middle portion of said annulus, and cooling means associated with said mandrel adjacent said middle and said second end portions of said annulus for cooling material located within said middle and said second end portions of said annulus.

4. Apparatus in accordance with claim 3 wherein said second end portion of said annulus has upstream and downstream zones, said upstream zone tapering in wall thickness from that of said middle portion to that of said downstream zone and said downstream zone having a substantially constant wall thickness along its length equal to said wall thickness of said second end of said annulus.

* * * * *